United States Patent
Kim et al.

(10) Patent No.: US 9,491,209 B2
(45) Date of Patent: Nov. 8, 2016

(54) WIRELESS IMAGE TRANSMISSION AND RECEPTION SYSTEM AND METHOD THEREFOR

(71) Applicant: RNWARE CO., LTD, Daegu (KR)

(72) Inventors: Young-gyu Kim, Daegu (KR); Hyo-jin Kim, Daegu (KR)

(73) Assignee: RNWARE CO., LTD., Daegu (KR)

( * ) Notice: Subject to any disclaimer, the term of this patent is extended or adjusted under 35 U.S.C. 154(b) by 0 days.

(21) Appl. No.: 14/768,377

(22) PCT Filed: Nov. 13, 2013

(86) PCT No.: PCT/KR2013/010291
§ 371 (c)(1),
(2) Date: Aug. 17, 2015

(87) PCT Pub. No.: WO2014/129726
PCT Pub. Date: Aug. 28, 2014

(65) Prior Publication Data
US 2016/0006777 A1    Jan. 7, 2016

(30) Foreign Application Priority Data

Feb. 20, 2013  (KR) .......................... 10-2013-0017944

(51) Int. Cl.
*H04B 5/00* (2006.01)
*H04L 29/06* (2006.01)
(Continued)

(52) U.S. Cl.
CPC ............ *H04L 65/4076* (2013.01); *H04B 1/03* (2013.01); *H04B 1/06* (2013.01); *H04B 5/0031* (2013.01);
(Continued)

(58) Field of Classification Search
CPC ..... H04B 10/22; H04B 5/0031; H04W 4/06; H04L 65/4076

USPC .......... 455/414.1, 414.3, 452.1, 3.06, 550.1, 455/557, 566, 41.2, 41.3, 500
See application file for complete search history.

(56) References Cited

U.S. PATENT DOCUMENTS

| 2005/0085242 A1* | 4/2005 | Nishizawa | G08G 1/123 455/456.1 |
| 2013/0074117 A1* | 3/2013 | Song | H04W 4/06 725/31 |
| 2015/0296176 A1* | 10/2015 | Kato | H04N 7/15 348/14.08 |

FOREIGN PATENT DOCUMENTS

| JP | 15008778 | 1/2003 |
| JP | 16312695 | 11/2014 |

(Continued)

OTHER PUBLICATIONS

International Search Report of PCT/KR2013/010291 (dated Jan. 20, 2014).

*Primary Examiner* — John J Lee

(57) ABSTRACT

The present invention relates to a wireless image transmission and reception system having a plurality of transmission devices (100) and a reception device (200), wherein the transmission device (100) includes: a transmission button (110) being turned on for transmitting the image data of the connected terminal (10) and the identifier of the transmission device (100); and an image transmission part (120) for transmitting wirelessly the image data and the identifier, and the reception device (200) includes: an image reception part (210) for receiving wirelessly the image data and the identifier; and an identifier registration module (220) for registering the identifier of the transmission device (100), thereby outputting the image data to a display device (20).

3 Claims, 2 Drawing Sheets

(51) Int. Cl.
| | | |
|---|---|---|
| *H04W 4/06* | (2009.01) | |
| *H04L 12/18* | (2006.01) | |
| *H04N 7/18* | (2006.01) | |
| *H04B 1/03* | (2006.01) | |
| *H04B 1/06* | (2006.01) | |
| *H04W 60/00* | (2009.01) | |
| *H04W 76/02* | (2009.01) | |
| *H04L 29/08* | (2006.01) | |

(52) U.S. Cl.
CPC ............... *H04L 12/18* (2013.01); *H04L 67/00* (2013.01); *H04N 7/185* (2013.01); *H04W 4/06* (2013.01); *H04W 60/005* (2013.01); *H04W 76/025* (2013.01)

(56) References Cited

FOREIGN PATENT DOCUMENTS

| KR | 1020020075332 | 10/2002 |
|---|---|---|
| KR | 1020060039791 | 5/2006 |
| KR | 1020070070356 | 7/2007 |

* cited by examiner

WIRELESS IMAGE TRANSMISSION AND RECEPTION SYSTEM AND METHOD THEREFOR

CROSS-REFERENCE TO RELATED APPLICATION

This application claims priority to and the benefit of Korean Patent Application No. 2013-0017944, filed on 20 Feb. 2013, the disclosure of which is incorporated herein by reference in its entirety.

BACKGROUND

1. Field of the Invention

The present invention relates to a wireless image transmission and reception system which allows participants to immediately transmit data images stored in their note books or smart pads to a PC or a display device for presentation according to their own intentions, and thus allows the participants to immediately share their opinions.

The present invention relates to a wireless image transmission and reception system including a plurality of transmission devices (100) and a reception device (200), wherein each of the transmission devices (100) includes a transmission button (110) turned on so as to transmit image data of a connected terminal (10) and an identifier of the transmission device (100); and an image transmission part (120) configured to wirelessly transmit the image data and the identifier, and the reception device (200) includes an image reception part (210) configured to receive wirelessly the image data and the identifier; and an identifier registration module (220) configured to register the identifier of the transmission device (100), thereby outputting the image data to a display device (20).

2. Discussion of Related Art

Recently, as smart pads are popularized, participants in an office meeting, a seminar, a conference or the like generally carry notebooks or smart pads.

Furthermore, it is expected that students will take a class with educational pads in the near future.

However, in a current meeting process, a presenter connects an USB memory storing presentation materials to a PC for presentation, or previously stores the presentation materials in the PC for presentation, and then makes presentations, while displaying the presentation materials on a screen connected to the PC for presentation.

Therefore, participants in the meeting may only watch the presentation materials provided in advance using their own notebooks or smart pads, and may not immediately share other materials in the meeting.

In other words, in order for the participants to share their own materials in the meeting, seminar, conference and class, the corresponding participant should stop the proceedings, transfer the materials to the PC for presentation, and advance his/her opinion around the PC for presentation. Since these processes are very inconvenient, and also a time interval occurs in the meeting, this is practically impossible.

Therefore, in order to allow the participants to share creative opinions, a wireless image transmission and reception system through which the participants may immediately transfer data images stored in their own notebooks or smart pads to the PC for presentation and thus may provide the opinions is required.

Also, in order to allow a second participant to immediately transfer his/her own data image and provide another opinion, while a first participant transfers his/her own data image and provides an opinion, a wireless image transmission and reception system which may process an image transmitting and receiving operation in real time is required.

Also, a wireless image transmission and reception system including a transmission device and a reception device which may be detachably installed at a notebook or a smart pad, and a PC or a display device for presentation so as to construct a wireless image transmission and reception network, to be returned after a meeting process and to be kept in a meeting room or the like is required.

Meanwhile, in Korean Patent Publication No. 10-2007-0070356 as a conventional technology which may wirelessly transmit and receive an image, there is disclosed a multi-port wireless image transmitting apparatus in which an image signal is compressed in an MPEG format and then wireless transmitted, and the transmitted compressed image signal is received, decoded and displayed.

This technology relates to a 1:1 wireless image transmission and reception, but does not describe an N:1 wireless image transmission and reception.

Also, since the transmission part and the reception device should have an MPEG encoder and decoder, respectively, manufacturing costs thereof may be increased.

Also, an MPEG calculation process is not appropriate to transmit and receive an image in real time for the purpose of the meeting or the like.

Also, as regards a conventional N:1 wireless image transmission and reception technology, there is disclosed a wireless projector system in Korean Patent Publication No. 10-2006-0039791.

Specifically, the system includes at least on image source device which stores image data; an image data transmission device which is installed at the image source device to receive an image data transmitting instruction transmitted through a wireless channel and to transmit image data stored in the image source device through the wireless channel; an image data reception device which communicates with the image data transmission device through the wireless channel, transmits the image data transmitting instruction to the image data transmission device according to an input instruction, and receives and outputs the image data transmitted in response to the image data transmitting instruction; and a projector in which the image data reception device is installed and which outputs and displays the image data output from the image data reception device through an optical lens.

That is, the image data transmission device is selected in the image data reception device using a selection button, and the image data transmission instruction is transmitted to the image data reception device so as to wirelessly transmit and receive an image. Also, a remote controller is separately provided to control the image data reception device.

However, since this is a reception device directed technology in which a selecting operation of the image data transmitting device and a transmitting operation of the image data are controlled in the reception device, it is not proper for a plurality of participants to immediately transmit their own data images.

This is because, in order for an N-th participant to transmit his/her own data image, the transmission device of the N-th participant has to be selected using the selection button of the remote controller, but it is difficult to select the transmitting device one by one on the spot of a conference, in which several hundred people participate, using the selection button of the reception device.

Also, since the conventional technology uses the selection button of the reception device or the remote controller, the number of the transmitting devices has to be limited, and thus it is not appropriate to the meeting, the seminar, the conference or the like in which various people participate.

SUMMARY OF THE INVENTION

The present invention is directed to a wireless image transmission and reception system which is capable of allowing participants to immediately transmit data images stored in their note books or smart pads to a PC or a display device for presentation according to their own intentions.

Also, the present invention is directed to a wireless image transmission and reception system which has a transmission button provided at one side of a transmission device to transmit image data of a corresponding transmission device by an operation of the transmission button, and thus to allow a plurality of participants to immediately transmit an image in real time.

Also, the present invention is directed to a wireless image transmission and reception system including a transmission device and a reception device which are detachably installed at a notebook or a smart pad, and a PC or a display device for presentation so as to be returned after a meeting, a conference, a seminar or the like and then to be kept in a meeting room or the like.

Also, the present invention is directed to a wireless image transmission and reception system in which the number of transmission devices is not limited so as to prepare for a meeting, a conference or a seminar having many participants.

According to an aspect of the present invention, there is provided a wireless image transmission and reception system including a plurality of transmission devices (100) and a reception device (200), wherein each of the transmission devices (100) includes a transmission button (110) turned on so as to transmit image data of a connected terminal (10) and an identifier of the transmission device (100); and an image transmission part (120) configured to wirelessly transmit the image data and the identifier, and the reception device (200) includes an image reception part (210) configured to receive wirelessly the image data and the identifier; and an identifier registration module (220) configured to register the identifier of the transmission device (100), thereby outputting the image data to a display device (20).

The transmission device (100) may start transmission of image data and an identifier by an ON operation of the transmission button (110).

An output of the display device (20) may be returned to an image before the image data is received.

The reception device (200) may receive the image data of the terminal (10) corresponding to the transmission button (110) which is turned on late in time.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

For example, it is appreciated that terms "module", "part" and "interface" mentioned throughout the present description either are software means, hardware means or a combination of them, and also should be interpreted based on the meanings corresponding to technical aspects of the present invention.

Therefore, the description proposed herein is just a preferable example for the purpose of illustrations only, not intended to limit the scope of the invention, so it should be understood that other equivalents and modifications could be made thereto without departing from the spirit and scope of the invention.

Before the description of the present invention with reference to the drawings, it is should be noted that the specific description of well-known structures which are not necessary to disclose the gist of the present invention, that is, could be obvious to those skilled in the art are not illustrated or specifically described.

Figure 1:
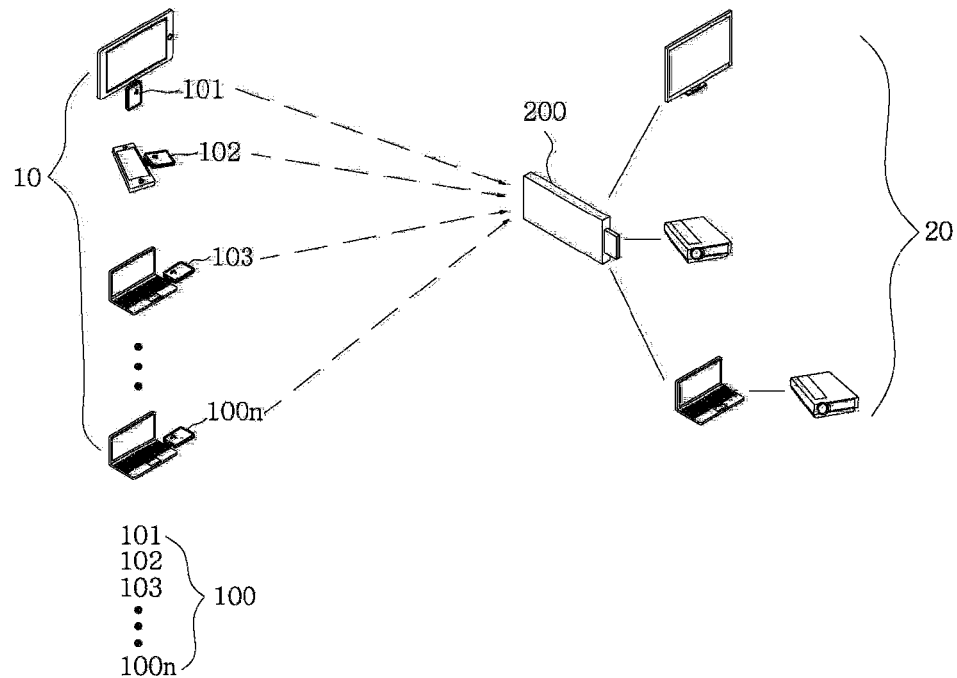
FIG. 1 is a view schematically illustrating a situation in which a wireless image transmission and reception system in accordance with the present invention is used.

FIG. 1 is a view schematically illustrating a situation in which a wireless image transmission and reception system in accordance with the present invention is used.

The wireless image transmission and reception system in accordance with the present invention includes a transmission device 100 and a reception device 200. The transmission device 100 is detachably installed at a terminal 10, in which image data is stored, so as to transmit the image data of the terminal 10 to the reception device 200.

Also, the reception device 200 serves to receive the image data transmitted from the transmission device 100 and to transmit the image data to a display device 20 at which the reception device 200 is detachably installed.

Any device which has software driving image data, and the stored image data may be used as the terminal 10. For example, the terminal 10 includes a notebook, a smart pad, a smart phone, a desk-top and so on.

Here, the image data means an image of video data, image data and office data (Word, Hangul, Excel, Power point or the like) output through the display device of the terminal 10, and the image data driving software means software driving each data.

Any device which has a displaying function of outputting the image data may be used as the display device 20. The display device 20 may or may not have the software driving the image data. This is because the image transmitted from the terminal 10 is already displayed on the terminal 10.

For example, the display device 20 includes a monitor, TV, a projector, a notebook, a desk-top PC and so on.

Figure 2:
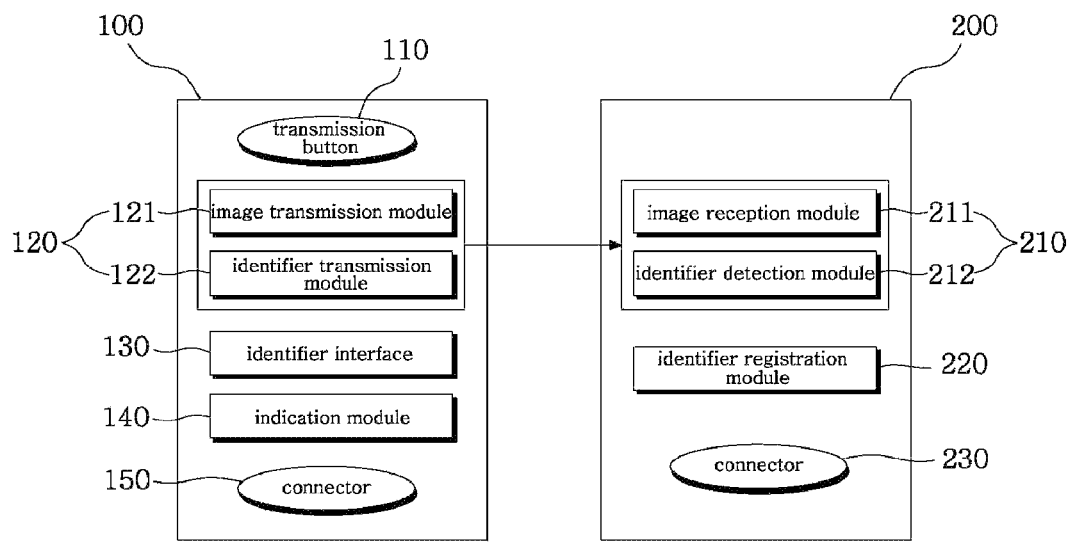
FIG. 2 is a view illustrating a main structure of the wireless image transmission and reception system in accordance with the present invention.
Figure 3:
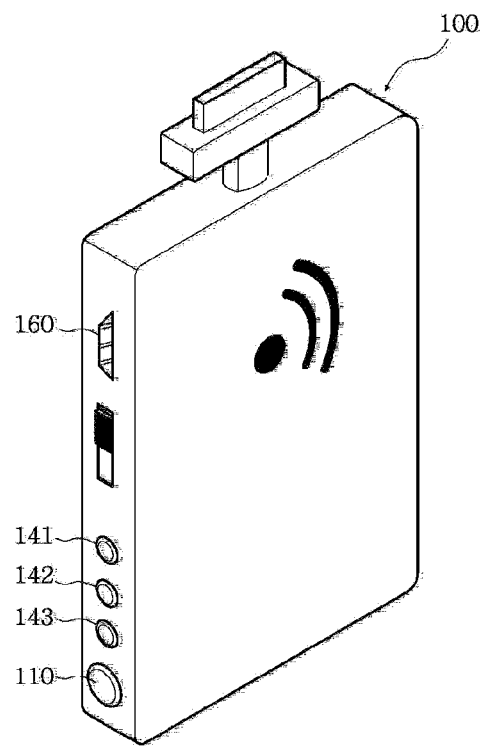
FIG. 3 is a view schematically illustrating an exterior of a transmission device included in the wireless image transmission and reception system in accordance with the present invention.

FIG. 2 is a view illustrating a main structure of the wireless image transmission and reception system in accordance with the present invention, and FIG. 3 is a view schematically illustrating an exterior of the transmission device included in the wireless image transmission and reception system in accordance with the present invention.

The wireless image transmission and reception system in accordance with the present invention includes a plurality of transmission devices 100 and one reception device 200.

The transmission device 100 includes a transmission button 110, an image transmission part 120, an identifier interface 130, an indication module 140 and a connector 150.

Also, referring to FIG. 3, the transmission device 100 may further include a power indication part 141, a transmission indication part 142, a battery indication part 143 and a connection port 160.

The transmission button 110 is a means for performing a function of turning on a function of the image transmission part 120, and also is a button type means for transmitting the image data of the terminal 10 and an identifier of the transmission device 100 to the reception device 200.

According to a design condition, the transmission button 110 may have various types, and thus may be formed in a switching or touching type.

Also, it may be configured so that the image is transmitted by pushing the transmission button 110, and the transmitting function is tuned off by pushing the transmission button 110 again.

For example, when a participant pushes the transmission button 110 to transmit an image on his/her own smart part, the image on the terminal 10 is immediately transmitted to the reception device 200 and output through the display device 20. Then, the participant pushes again the transmission button 110 after outputting the image on a screen and presenting his/her opinion, and ends the transmitting, and thus the screen is returned to an image of the PC for presentation.

Of course, when a function of ending the transmitting using the transmission button 110 is not provided, the screen is not returned to the image of the PC for presentation, but may be switched by an operation of the PC for presentation or an operation of the transmission button 110 by other participant.

The image transmission part 120 is a means for performing a function of transmitting the image data and the identifier, and may include an image transmission module 121 and an identifier transmission module 122.

The image transmission module 121 serves to transmit the image data output through the screen of the terminal 10 to the reception device 200, such that the data is transmitted according to a protocol which secures a wireless network between the transmission device 100 and the reception device 200.

Here, the networking protocol means a protocol for a TCP/IP wireless LAN network, a ubiquitous sensor network, a wireless sensor network or other wireless local area network.

When a sensor network is used, an OS for the sensor network may be installed and operated at both of the transmission device 100 and the reception device 200 according to conditions.

The identifier transmission module 122 performs serves to transmit the identifier of the transmission device 100 to the reception device 200, such that the identifier based on the networking protocol between the transmission device 100 and the reception device 200 is transmitted.

For example, in the case of the TPC/IP wireless LAN network, an IP address is the identifier, and in the case of the sensor network, a sensor ID is the identifier.

That is, in the wireless LAN network, the IP address of the transmission device 100 in which the transmission button 110 is pushed may be transmitted along with the image data, and in the sensor network, the sensor ID may be included in a packet head and then transmitted.

The identifier interface 130 is an interface means which enables the networking, has an inherent identifier based on a network interface, which serves as the identifier of the transmission device 100.

For example, the identifier as the interface means is already determined at the identifier interface 130 used in a first transmission device 100, and thus discrimination of the first transmission device 100 is also ensured.

The indication module 140 serves to operate an LED pilot lamp provided at an outside of the transmission device 100 and thus to indicate whether the transmission device 100 is operated.

For example, the power indication part 141, the transmission indication part 142 and the battery indication part 143 may be realized by the LED pilot lamps, and the indication module 140 may inform a user of a state, in which functions of power, data transmission and battery (not shown) are operated, through each indication part.

That is, the power indication part 141 may be indicated when the transmission device 100 is operated, and the transmission indication part 142 may be indicated when the image data is transmitted to the reception device 200 by the operation of the transmission button 110, and the battery indication part 143 may be indicated a battery remain.

In the case of the transmission device 100 which receives the power from the terminal 10, the battery indication part 143 may be omitted according to the conditions.

The connector 150 is a means which is provided at one side of the transmission device 100 to be inserted and connected into the terminal 10.

Here, the connector 150 may be formed to be connectable to an HDMI, Samsung I/O 30 PIN, or Apple I/O 30 PIN terminal, and thus to be selectively used by the user. According to the design conditions, the connector 150 may be one of connection terminals, such as an USB terminal or a monitor terminal (an RGB connection terminal and a DVI connection terminal), and an iPhone or android MicroUSB terminal, which are connected with the terminal 10.

The transmission device 100 may further include the connection port 160 which serves as an interface for charging a built-in battery.

According to the design conditions, the connection port 160 may be formed so that a memory such as an USB and SD card is inserted therein, and thus may serve as a memory hub. For example, while the transmission device 100 is inserted, the USB may be connected to the connection port 160 so as to move USB data to the terminal 10.

The reception device 200 includes an image reception part 210, an identifier registration module 220, a connector 230 and a network interface (not shown). Here, the network interface means a network interface means which enables the networking.

The image reception part 210 is a means which receives the image data and the identifier from the image transmission part 120 and then transmits them to the display device 20, and includes an image reception module 211 and an identifier detection module 212.

The image reception module 211 serves to receive the image data transmitted from the image transmission module 121, and the identifier detection module 212 serves to detect the identifier transmitted from the identifier transmission module 122.

Here, the image reception module 211 and the identifier detection module 212 serve to receive data according to the protocol which secures the wireless network between the transmission device 100 and the reception device 200.

The identifier detection module 212 serves to detect the identifier and to allow the image transmitted from the transmission device 100 corresponding to the detected identifier to be transmitted. Here, the image of the transmission device 100 corresponding to the identifier which is late in time is transmitted.

For example, in the case in which a participant of a first transmission device 100 pushes the transmission button 110 and transmits an image of a first terminal 10, and then another participant of a fifth transmission device 100 pushes the transmission button 110, the image displayed on the screen is changed from the image of the first terminal 10 to the image of the fifth terminal 10.

Therefore, the participants may immediately and actively transmit their own image.

The identifier registration module 220 serves to previously register the identifier of the transmission device 100 at the reception device 200 and thus to detect the corresponding transmission device 100 in response to the operation of the transmission button 110.

That is, the transmission device 100 and the reception device 200 are connected to the terminal 10 and the display device 20, respectively, to construct the network between the transmission device 100 and the reception device 200, when power is turned on. In this process, the identifier of the transmission device 100 is automatically registered.

The connector 230 is a connection terminal which connects the reception device 200 and the display device 20. Here, the connector 230 may be one of the connection terminals, such as the USB terminal and the monitor terminal (the RGB connection terminal and the DVI connection terminal), which are connected with the display device 20 and achieves a connection object.

Figure 4:
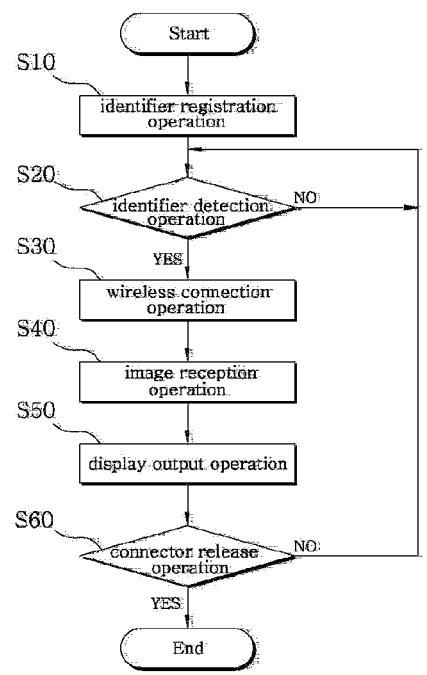
FIG. 4 is a flowchart illustrating a method of using the wireless image transmission and reception system in accordance with the present invention.

FIG. 4 is a flowchart illustrating a method of using the wireless image transmission and reception system in accordance with the present invention.

A wireless image transmission and reception method may include an identifier registration operation S10, an identifier detection operation S20, a wireless connection operation S30, an image reception operation S40 and a display output operation S50, and may be further include a connector release operation S60.

(1) Identifier Registration Operation S10

In the identifier registration operation S10, the identifiers of the plurality of transmission devices 100 are registered at one reception device 200. When the transmission device 100 and the reception device 200 are connected with the terminal 10 and the display device 20, respectively, and the power is turned on, the identifiers of the transmission devices 100 are automatically registered.

(2) Identifier Detection Operation S20

In the identifier detection operation S20, among the identifiers of the transmission devices 100 registered in the identifier registration operation S10, the transmission device 110 in which the transmission button 110 is operated is detected.

When the identifier of the transmission device 100 is detected by the operation of the transmission button 110, the next operation is started, but when the identifier of the transmission device 100 is not detected, an operation of detecting again the identifier is performed.

Also, the identifier which is transmitted the latest in time is detected and processed.

(3) Wireless Connection Operation S30

In the wireless connection operation S30, the transmission device 100 corresponding to the identifier is wirelessly connected with the reception device 200 after the identifier detection operation S20.

(4) Image Reception Operation S40

In the image reception operation S40, the image data transmitted from the transmission device 100 corresponding to the identifier in the identifier detection operation S20 is received after the wireless connection operation S30.

(5) Display Output Operation S50

In the display output operation S50, the image data received in the image reception operation S40 is output through the connected display device 20.

(6) Connector Release Operation S60

In the connector release operation S60, when the transmission button 110 is turned off by an operation of the user, the screen of the display device 20 is returned to an initial image before the image data is transmitted.

When a function of turning off the transmission using the transmission button 110 is not provided, the connector release operation S60 may be omitted according to the design conditions.

Due to the above-mentioned wireless image transmission and reception system, the plurality of transmission devices may be connected to on reception device, and thus the wireless transmission and reception of the image data may be immediately and selectively performed by the transmission button provided at one side of the transmission device.

According to the wireless image transmission and reception system of the present invention, it is possible to allow the participants to immediately transmit the data images stored in their note books or smart pads to the PC or the display device for presentation, and thus to allow the participants to immediately share their opinions.

The wireless image transmission and reception system of the present invention includes the transmission device and the reception device which are kept in the meeting room or the like and then, if necessary, detachably installed at the notebooks or the smart pads of the participants, and the PC or the display device for presentation so as to be applied to various meetings, conferences or seminars.

According to the wireless image transmission and reception system of the present invention, the number of transmission devices is not limited so as to prepare for the meeting, the conference or the seminar having many participants.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A wireless image transmission and reception method in which a transmission device (100) connected to a terminal (10) wirelessly transmits image data of the terminal (10) to a reception device (200) and outputs the image data through a display device (20), comprising:

an identifier registration operation (S10) of registering identifiers of a plurality of transmission devices (100) at the reception device (200);

an identifier detection operation (S20) of detecting the transmission device (100), in which a transmission button (110) is turned on, among the identifiers of the transmission devices (100) registered in the identifier detection operation (S20), and detecting the transmission device (100) of the transmission button (110) which is turned on late in time;

a wireless connection operation (S30) of wirelessly connecting the transmission device (100) corresponding to the identifier with the reception device (200) after the identifier detection operation (S20);

an image reception operation (S40) of receiving the image data transmitted from the transmission device (100) corresponding to the identifier in the identifier detection operation (S20); and a display output operation (S50) of outputting the image data received in the image reception operation (S40) through a connected display device (20).

2. The method of claim 1, further comprising, after the display output operation (S50), a connector release operation (S60) of returning an output of the display device (20) to an image before the image data is received, when the transmission button (110) is turned off.

3. A wireless image transmission and reception system, the system comprising:

a plurality of transmission devices (100) and a reception device (200)

wherein each of the plurality of transmission devices (100) comprises:

a transmission button (110) configured to transmit image data of a terminal being connected to each of the transmission devices, the transmission button configured to transmit an identifier of each of the transmission devices; and an image transmission module configured to wirelessly transmit the image data of the terminal and the identifier of the transmission devices;

wherein the reception device (200) comprises:

an image reception module (211) configured to wirelessly receive the image data and the identifier;

an identifier registration module (22) configured to register the identifier of the plurality of the transmission devices (100);

an identifier detection module (212) configured to detect the transmission device (100), in which the transmission button (110) is turned on, among the identifiers of the transmission devices (100) registered in the identifier registration module (220), the identifier detection module (212) configure to detect the transmission device (100) of the transmission button (110) which is turned on late in time; and an image reception module (211) configured to receive the image data transmitted from the image transmission device (100) corresponding to the identifiers in the identified detection module (212);

wherein wireless connection means for wirelessly connecting the transmission devices corresponding to the identifiers with the reception device; and wherein display means for outputting the image data received in the image reception module through a display device being connected to the reception device.

* * * * *